Patented May 11, 1943

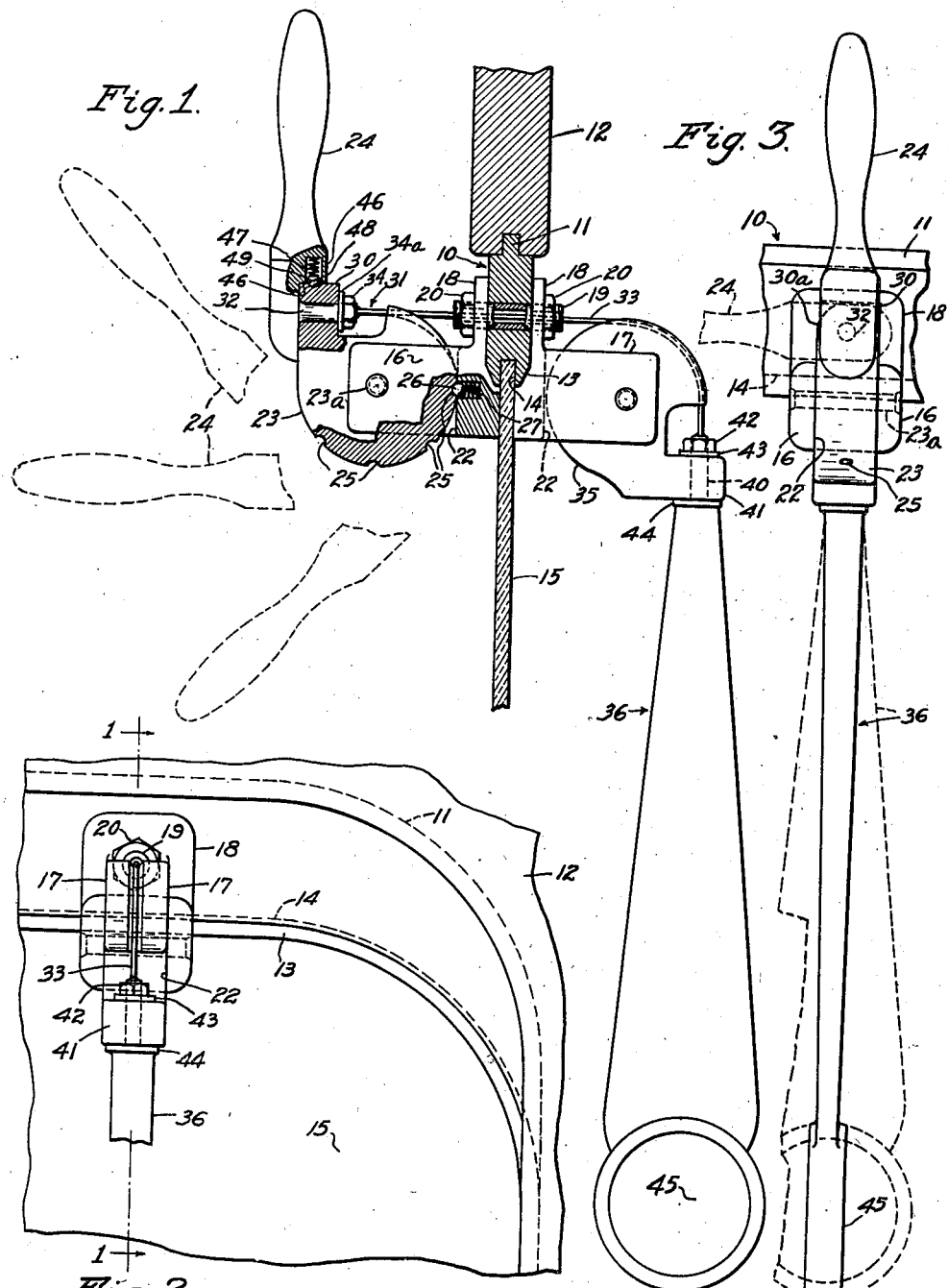

2,318,690

UNITED STATES PATENT OFFICE 2,318,690

TRAFFIC SIGNAL FOR MOTOR VEHICLES

Shelley B. Humphrey, Huntington Park, Calif.

Application December 19, 1941, Serial No. 423,671

8 Claims. (Cl. 116—52)

This invention relates to a traffic signal, mountable upon a motor vehicle.

Among the objects of the invention are: To provide an improved mounting means for supporting the movable parts of the device, said mounting means being quickly applicable to self-propelled vehicles now in use without the use of screws or bolts; to provide a superior connection between an operating handle or lever and the parts of the device actuated thereby; and to provide a more sturdy, durable arrangement of working parts.

Other objects, advantages and features of invention will hereinafter appear.

Referring to the accompanying drawing, which illustrates what is at present deemed to be a preferred embodiment of the invention, Fig. 1 is a front elevation of the complete device, a fragment of the side of the car to which it is attached being included in the view. A part of this view is sectioned on line 1—1 of Fig. 2.

Fig. 2 is a fragmental side elevation of the device as viewed from the outside of the automobile window in which it is mounted.

Fig. 3 is an elevation of the device per se, parts being broken away, the elevation being from left to right of Fig. 1.

Referring in detail to the drawing, the invention includes a mounting strip 10 which has a flange or tongue 11 extending along the midwidth of its upper edge to fit into the grooved lower edge of the top piece 12 of the window frame at that side of the car. The lower edge portion of said strip 10 is beveled at 13 at each side and is grooved at 14 along its midwith to fit over the upper edge of the window pane 15.

An angularly shaped inner bracket 16, mounted within the car, cooperates with a similarly shaped outer bracket 17. These brackets are horizontally alined with each other, each bracket having an upper extension 18 apertured to admit a cylindrical bolt 19, said bolt also passing through the mounting strip 10. A nut 20 screws on to each projecting end portion of said bolt, these nuts abutting against said extensions 18 and clamping the brackets 16 and 17 in place. Simplification of structure results from utilizing said bolt 19 as a securing means common to both of said brackets.

Each of the brackets 16 and 17 has a bifurcated body portion resulting from a broad, deep groove 22 being cut into its outer end. This arrangement adapts the inner bracket 16 for swingably supporting the shank 23 of an operating lever 24 upon a pivot 23a.

Said shank 23 is mainly circular in shape, notches 25 being cut into its periphery, a ball check 26, seated in a suitable recess in the bracket 16, cooperating with these notches to releasably maintain the movable parts of the device in the selected signaling position. A spring 27 urges said ball 26 toward the notched periphery of the shank 23.

The shank 23 has a tangential projection 30 and adjacent to one side of said projection a peripheral recess 31 which aids in outlining the projection 30. Said projection is apertured to receive a pivot finger 32 carried by the lever 24, and to this finger is axially attached the flexible operating shaft 33, this part of the structure being completed by the nut 34 and anti-friction washer 34a.

On the outside of the car is mounted, upon the bracket 17, the swingable shank 35 of the signal arm 36. By preference and as shown the shank 35 is made of nearly the same shape and size as the shank 23 in order to lower the cost of manufacture.

The signal arm 36 has a pivot portion 40 turnable within the projection 41 of the shank 35, a nut 42 and antifriction washers 43 and 44 cooperating and serving to attach the adjacent end portion of the flexible shaft 33. The outer end portion of the signal arm 36 carries a circular reflector 45.

In order normally to maintain the handle of the operating lever 24 in the upstanding relation to its shank 23 shown in full lines in Fig. 1, said handle is furnished with a ledge 46 containing a socket 47; a spring pressed ball 48 occupying the mouth portion of said socket. In the adjacent curved part 30a of the shank 23 is a semicircular seat 49 which said ball engages to releasably maintain the handle of the lever in the upstanding position shown thus also maintaining the flexible shaft 33 in such a rotational position that it, in turn maintains the signal arm 36 together with its reflecting signal 45 rotationally positioned as shown in Fig. 1. Said arm 36 may also be rotationally adjusted while inclined in accordance with its various signaling positions. The handle of the operating lever 24, when swung through one plane about the pivot 23a exerts traction upon the connection or flexible shaft 33 to vary the angular positions of the signal arm 36, and when swung in another plane about the pivot finger 32 rotationally adjusts the signal arm 36 together with its reflector 45. At times the operator will find it desirable to turn the signal arm 36 about its axis to a position wherein the reflector 45 carried thereby will extend parallel to the length of the car so that said reflector will be practically invisible to traffic both rearward and forward of the car. Said reflector may have one face red for rearward observation and otherwise colored on its opposite face.

I claim:

1. In a signal structure of the kind described, a mounting strip supportable in a window opening of an automobile, a pair of brackets, said brackets abutting against opposite sides of said strip, a tubular bolt extending through said strip and through a portion of each of said brackets, means cooperating with said bolt to secure said brackets to said strip, an operating lever mounted on the bracket which is located at the inner side of the car window to swing in two different planes applies traction to said shaft and thereby mounted on the bracket which is on the outer side of the car window and a flexible shaft extending through said tubular bolt, said shaft operatively connecting said lever and arm whereby swinging said lever in one of the aforesaid planes applies traction to said shaft and thereby swings said arm laterally, and swinging said lever in the other of the aforesaid planes acts tortionally upon said shaft and thereby turns axially said arm about its longitudinal axis.

2. In a signal structure of the kind described, mounting means supportable in a side wall of the tonneau of an automobile, one portion of said mounting means being inside the tonneau and another portion outside thereof, there being a passage through said mounting means, an operating lever mounted on the portion of said mounting means which is inside the tonneau to swing in two different planes, a signal arm swingably and turnably mounted on the portion of said mounting means which is outside the tonneau, and a flexible shaft extending through said passage in the mounting means, said shaft being attached both to said lever and to said signal arm whereby swinging said lever in one of the aforesaid planes moves said shaft longitudinally and thereby swings said arm laterally in relation to its length and swinging said lever in its other aforesaid plane acts tortionally upon said shaft and thereby axially turns said arm about its axis.

3. In a signal structure of the kind described, a mounting strip supportable in a window opening of an automobile, a pair of brackets, said brackets abutting against opposite sides of said strip, a tubular bolt extending through said strip and through a portion of each of said brackets, means cooperating with said tubular bolt to secure said brackets to said strip, said brackets each having a body portion below said bolt into the outer side of which is cut a slot, an operating lever having a flattened shank portion which occupies the slot of the bracket that is located on the inner side of the car window, a pivot passing through the slotted portion of such bracket and swingably supporting said lever shank to allow movement of said operating lever in a first plane, said operating lever being additionally pivoted to said shank portion to allow movement in a second plane, a flexible connection secured to said operating lever and passing through said bolt, and a signal arm pivotally mounted upon the bracket which is located on the outer side of the car window to swing to various signaling positions, said flexible connection being fastened to said arm in an eccentric relation to its pivot, whereby movement of said operating lever in one plane will cause lateral movement of said signal arm, and movement of said operating lever in a second plane will cause turnable movement of the signal about its longitudinal axis.

4. In a signal structure of the kind described, mounting means supportable in a wall of the tonneau of an automobile in such a manner as to have an outer portion which is exposed exteriorly of the tonneau and an inner portion which is exposed interiorly thereof, said mounting means comprising an inner bracket and an outer bracket having a single securing bolt in common, a signal arm mounted upon said outer bracket of said mounting means to swing laterally to and from an extended position in relation to the tonneau, said signal arm having a flattened outer end portion and being axially turnable to increase and diminish the visibility of said flattened portion from the viewpoint of observers in advance of or behind the vehicle, a flexible connection operatively connected with said arm and extending therefrom through the aforesaid mounting means to the interior of the tonneau, and means within the tonneau mounted upon said inner bracket to apply both traction and torsion to said flexible connection both to swing said signal arm upwardy from a pendant position and to turn it about its longitudinal axis.

5. In an operating means for an automobile signal, a bracket, mounting means for said bracket supportable by the wall of a tonneau, a flexible shaft, said shaft extending through said mounting means to operate a signal exteriorly of the tonneau, a circular member which is centrally and turnably pivoted to said bracket within the tonneau, an operating arm carried by said circular member and extending tangentially therefrom, said arm being pivoted to said circular member to swing relatively thereto about an axis extending at a right angle to said axis about which said circular member is turnable, the aforesaid flexible shaft being connected with said operating arm at the pivotal mounting of the latter so that swinging the arm applies tortion to the shaft, and a portion of said shaft being windable upon the aforesaid circular member when the latter is turned about its pivot.

6. In an operating means for an automobile signal, mounting means supportable by the wall of a tonneau, a bracket supportable exteriorly of the tonneau by said mounting means, a flexible shaft, said shaft extending through said mounting means, a signal arm having a circular shank portion turnably supported by said bracket exteriorly of the tonneau, said flexible shaft being connected with and windable upon said shank portion to swing said arm upwardly against gravity to a signaling position, said arm being turnable in relation to its said shank and carrying a signal part having a face portion which is moved to and from a signaling position by the turning of the arm, said flexible shaft being axially connected with that part of the arm which is turnable in relation to its shank, and means within the tonneau operatively connected with said flexible shaft both to turn it and to apply traction to it.

7. In a signal structure of the kind described, a mounting member supportable in the wall of the tonneau of an automobile in such a manner as to have an outer portion which is exposed exteriorly of the tonneau and an inner portion which is exposed interiorly thereof, two brackets, one having an upstanding extension which abuts against the inner side of said mounting member and the other having an upstanding extension which abuts against the outer side thereof, securing means common to said brackets extending through said mounting member and connected with the upper extension of each of said brackets, a movable signal element mounted on one of said brackets, signal operating means mounted on the other of said brackets, and means extending through said mounting member and operatively connecting said movable signal element with said signal operating means.

8. The subject matter of claim 7, and said securing means consisting of a tubular bolt and said operating connection extending longitudinally through said tubular bolt.

SHELLEY B. HUMPHREY.